United States Patent [19]
Downey

[11] Patent Number: 6,109,459
[45] Date of Patent: Aug. 29, 2000

[54] STORAGE SYSTEM FOR DEEP SEA FISHING RODS AND REELS

[76] Inventor: William A. Downey, 1223 Little Creek Rd., Durham, N.C. 27713

[21] Appl. No.: 09/162,617

[22] Filed: Sep. 29, 1998

[51] Int. Cl.[7] .......................................................... A47F 7/00
[52] U.S. Cl. ............................................................... 211/70.8
[58] Field of Search .................................. 211/70.8, 60.1, 211/64, 70.5; 224/162, 913, 922

[56] References Cited

U.S. PATENT DOCUMENTS

| | | | |
|---|---|---|---|
| 2,504,385 | 4/1950 | Braatz | 43/21.2 |
| 2,536,797 | 1/1951 | Cooke | 211/70.8 |
| 2,606,731 | 8/1952 | Harris | 248/42 |
| 2,797,851 | 7/1957 | Leake | 211/70.8 |
| 3,564,753 | 2/1971 | Fravel | 43/21.2 |
| 3,653,144 | 4/1972 | Rocka | 43/54.5 |
| 4,132,381 | 1/1979 | McClellan | 211/70.8 |
| 4,974,537 | 12/1990 | Martin | 114/255 |
| 5,127,355 | 7/1992 | Magers et al. | 114/255 |
| 5,588,542 | 12/1996 | Winkler, Jr. et al. | 211/70.8 |
| 5,632,427 | 5/1997 | Gattuso et al. | 224/309 |
| 5,678,700 | 10/1997 | Crosson, Jr. | 211/70.8 |

*Primary Examiner*—Alvin Chin-Shue
*Assistant Examiner*—Sarah Purol
*Attorney, Agent, or Firm*—Jenkins & Wilson, P.A.

[57] ABSTRACT

A storage system for a fishing rod and reel which includes a mounting block comprising a top face, a bottom face, a front face, a rear face, and two lateral faces, the rear face extending downwardly from the top face to the bottom face for a greater distance than the front face to define a bottom edge along each of the lateral faces which tapers downwardly from the front face to the rear face; a rod-receiving notch formed in the bottom face of the mounting block between the two lateral faces and extending upwardly into the block toward the top face and laterally into the block toward the lateral faces for a height and width sufficient to accept a rod, the notch having lateral edges, the lateral edges of the notch, and the bottom face of the block and the bottom edges of the lateral faces defining contact surfaces for a reel along the bottom face of the block; and a strap for securing a rod and reel into the mounting block.

26 Claims, 4 Drawing Sheets

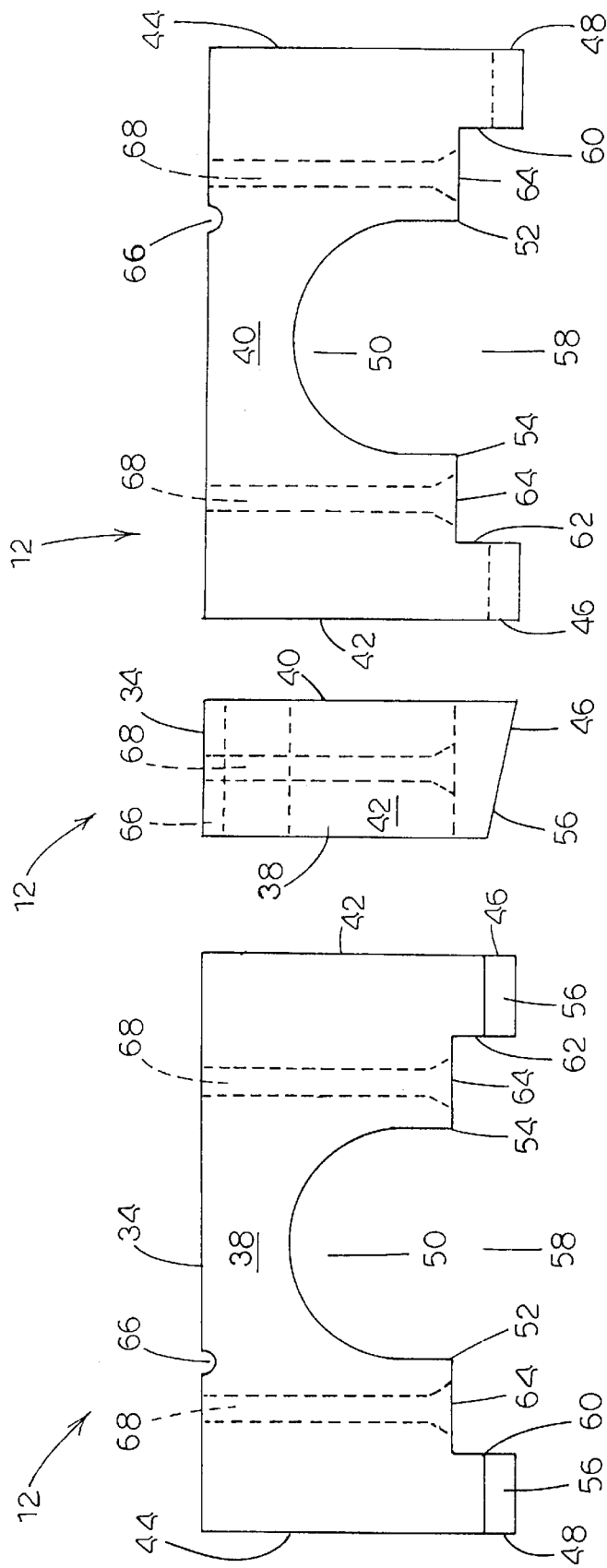

STORAGE SYSTEM FOR DEEP SEA FISHING RODS AND REELS

TECHNICAL FIELD

The present invention relates generally to a storage system for fishing rods and reels. More particularly the present invention relates to a storage system for fishing rods and reels that is suitable for storage of deep sea fishing rods and reels.

BACKGROUND ART

It will be appreciated by both novice and expert fishermen alike that it is difficult to store and transport fishing rods and reels. A particular problem concerns preventing the reels from clashing together during storage and transport. Clashing of the reels usually damages the reels, and in some cases, renders them inoperable. This problem is exacerbated in deep sea fishing in that the rods and reels used in deep sea fishing are usually larger and more expensive that other fishing rods and reels. Additionally, when stored aboard a boat, reels are more likely to clash together during the rough seas which are often encountered in deep sea fishing.

There have been several attempts to provide fishing rod and reel holders or storage systems in the prior art. One such attempt is set forth in U.S. Pat. No. 5,632,427 issued May 27, 1997 to Gattuso et al., which discloses a fishing rod and reel holder which includes a J-shaped notch in which the mount for a spinning reel may be inserted as the handle for a fishing rod is slid into opening of a rod handle receiving cylinder. The J-shaped notch thus secures the reel mount as opposed to the reel itself. Shock cords further secure the reel and the rod shaft into the holder. The holder may be mounted on an overhead of a boat for carrying the rods on a boat. But, the disclosure of this patent does not address the problem of preventing the reels from clashing or banging together when stored.

Another such attempt is set forth in U.S. Pat. No. 3,653,144 issued to Rocka on Apr. 4, 1972, which discloses a fishing rod and reel storage device which includes a confining holder with an opening for the insertion and removal of the reel. The holder extends at a angle from a bracket. The holder also includes a base and a wall member, which confine a reel. The holder also includes a series of apertures for passage of the connection between the reel and rod and for passage of a portion of the fishing lines contained in the reel. The holder is an essentially cylindrical structure which includes apertures to facilitate receiving and removing the rod and reel. But, the disclosure of this patent does not address the problem of preventing the reels from clashing together when stored.

U.S. Pat. No. 5,678,700 issued to Crosson. Jr. on Oct. 21, 1997 discloses a reel and rod hanger which includes a bracket having an indented bowl for receiving the reel of a fishing rod. The bracket also includes a series of slots which receive the shaft of the fishing rod. The particular problem to be solved by this reel and rod hanger is the facilitation of the mounting of rods and reels in an inverted position so that any moisture within the reels will flow downwardly and out of the reel. However, the disclosure of this patent does not address the problem of preventing the reels from clashing together when stored.

What is needed is a fishing rod and reel storage system that reduces the chance that the reels will clash together when stored. A long-felt need for such a system exists, particularly in the storage of rods and reels suitable for deep sea fishing.

SUMMARY OF THE INVENTION

In accordance with the present invention, a storage system for a fishing rod and reel is disclosed herein. The system comprises a mounting block comprising a top face, a bottom face, a front face, a rear face, and two lateral faces, the rear face and the front face extending downwardly from the top face to the bottom face to define a bottom edge along each of the lateral faces; a rod-receiving notch formed in the bottom face of the mounting block between the two lateral faces and extending upwardly into the block toward the top face and laterally into the block toward the lateral faces for a height and width sufficient to accept a rod, the notch having lateral edges, the lateral edges of the notch, the bottom face of the block and the bottom edges of the lateral faces defining contact surfaces for a reel along the bottom face of the block; and a strap for securing a rod and reel into the mounting block. Preferably, the rear face of the mounting block extends downwardly from the top face for a greater distance than the front face to define a bottom edge along each of the lateral faces which tapers downwardly from the front face to the rear face.

The mounting block can further comprise a reel-receiving notch formed in the bottom face between the bottom edges of the lateral faces and the lateral edges of the rod-receiving notch, the reel-receiving notch having a lesser width than the mounting block and a greater width than the rod-receiving notch to define a second contact surface for a reel between the bottom edges of the lateral faces and the lateral edges of the rod-receiving notch. The mounting block can also further comprise a notch for receiving the strap for securing the rod and reel into the mounting block, the strap-receiving notch formed on at least one face of the mounting block. Preferably, the strap-receiving notch is formed on the top face of the mounting block.

In accordance with the present invention the system can further comprise a second mounting member having a tip-receiving structure formed therein for receiving a tip of a rod. The system can also comprise a third mounting structure, the third mounting structure having a bore formed therethrough for receiving a handle of a fishing rod.

Accordingly, it is an object of the present invention to provide a fishing rod and reel storage system that prevents reels from clashing together when stored.

It is another object of the present invention to provide for the storage of larger and comparatively more expensive reels and rods that are used in deep sea fishing.

It is still another object of the present invention to provide a fishing rod and reel storage system that is easily installed.

It is still a further object of the present invention to provide a fishing rod and reel storage system which facilitates storage and removal of reels and rods, particularly on a boat.

It is yet a further object of the present invention to provide a fishing rod and reel storage system which provides for compact, space-saving storage of a rod and reel.

Some of the objects of the invention having been stated hereinabove, other objects will become evident as the description proceeds, when taken in connection with the accompanying drawings as best described hereinbelow.

3

Figure 6:
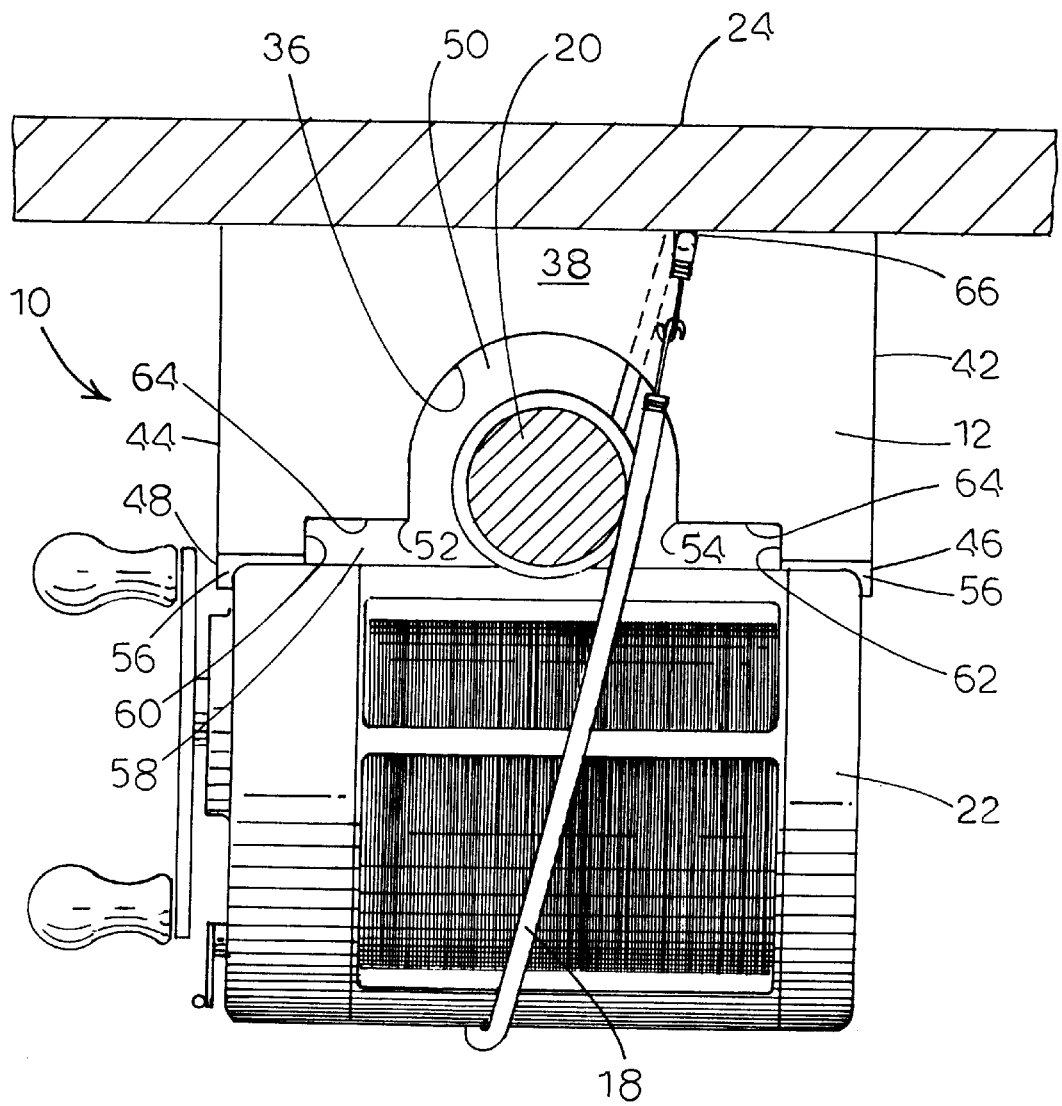

FIG. 3 of the drawings is a front view of the mounting block of the present invention;

FIG. 4 of the drawings is a side view of the mounting block of the present invention;

FIG. 5 of the drawings is a rear view of the mounting block of the present invention; and FIG. 6 of the drawings is a front view of the storage system of the present invention including the mounting block and showing a reel and rod mounted therein.

DETAILED DESCRIPTION OF THE PREFERRED EMBODIMENT

Figure 1:
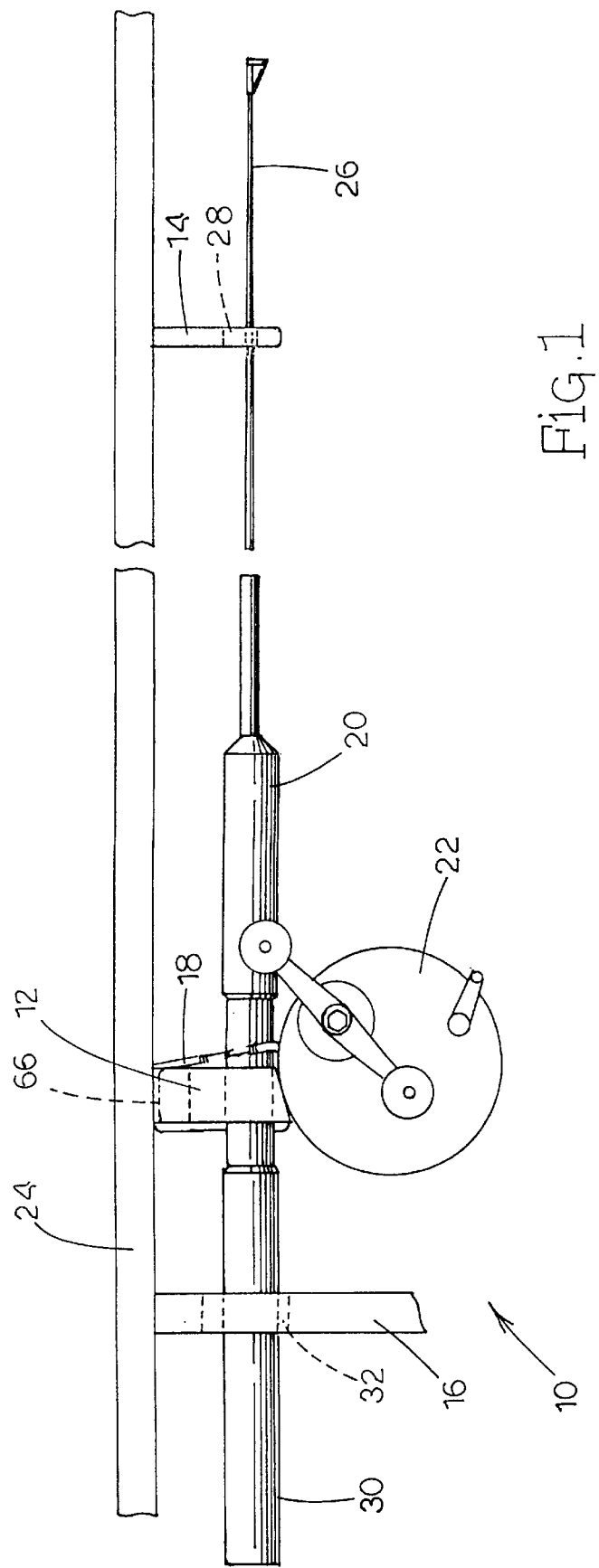
FIG. 1 of the drawings is a partial side view of the fishing rod and reel storage system of the present invention.

Referring now to the drawings, wherein like reference numerals refer to like parts throughout, the system of the present invention is referred to at 10. Referring particularly to FIGS. 1 and 6, system 10 comprises first mounting block 12, second mounting member 14, third mounting structure 16, and strap 18. Mounting block 12, mounting member 14, and mounting structure 16 are glued, nailed, screwed, or otherwise attached to a deck 24 in a boat, for example. Rod 20 and reel 22 are mounted within system 10 such that rod 20 is above reel 22. The ability of system 10 to hold rod 20 in a position above reel 22 provides for more space within the storage area on the boat and is thus believed to represent a significant advance in the fishing reel and rod storage system art.

As depicted in FIG. 1, mounting member 14 and third mounting structure 16 each include bores 28 and 32, respectively, to receive tip 26 and handle 30 of rod 20, respectively. However, mounting member 14 may optionally comprise any member having a tip-receiving structure formed therein for receiving a tip of a rod. Examples of such members include a hook, a clamp, a member including a pair of concentric clamps where the internal clamp is rotatably mounted within the outer clamp to secure the tip of the rod within the member, or any other suitable member as would be apparent to one having ordinary skill in the art. Also optionally, third mounting structure 16 may comprise a bulkhead within the boat, a block having an indented surface for receiving the handle 30 of the rod 20, or any other suitable structure as would be apparent to one having ordinary skill in the art.

Referring now to FIGS. 2–5, details of the improved mounting block 12 of the present invention are presented. Mounting block 12 includes a top face 34, a bottom face 36, a front face 38, a rear face 40, and first and second lateral faces 42 and 44, respectively. As best seen in FIG. 4, rear face 40 extends downwardly from top face 34 for a greater distance than front face 38 to define bottom edges 46 and 48 of first lateral face 42 and second lateral face 44. Bottom edges 46 and 48 thus taper downwardly from front face 38 to rear face 40.

Continuing with FIGS. 2–5, mounting block 12 further comprises a rod receiving notch 50 formed in the bottom face 36 of mounting block 12, preferably in a substantially medial position between lateral faces 42 and 44. Rod-receiving notch 50 extends upwardly into mounting block 12 toward top face 34 and laterally into mounting block 12 toward lateral faces 42, 44 for a height and width sufficient to accept a rod. Rod-receiving notch 50 has lateral edges 52 and 54. As seen in FIGS. 2–5, rod-receiving notch 50 preferably comprises an arcuate shape running from lateral edge 52 to lateral edge 54.

Continuing with FIGS. 2–5, mounting block 12 further comprises a reel-receiving notch 58 formed in the bottom face 36 of mounting block 12 between bottom edges 46 and 48 of lateral faces 42 and 44 and lateral edges 52 and 54 of rod-receiving notch 50. Reel-receiving notch 58 is less wide than mounting block 12 while being wider than rod-receiving notch 50 such that contact surfaces 64 are defined. Reel-receiving notch 58 is also bounded by first lateral wall 60 and second lateral wall 62.

Continuing with FIGS. 2–5, bottom edges 46 and 48 of first and second lateral faces 42 and 44 of mounting block 12 in conjunction with first and second lateral walls 60 and 62 of reel-receiving notch 58 define contact surfaces 56 on bottom face 36. As described above, due to the taper of lateral edges 46 and 48 of lateral faces 42 and 44, contact surfaces 56 also taper downwardly from front face 38 towards rear face 40, as best seen in FIGS. 3 and 4. Contact surfaces 56 are used for mounting larger reels, while contact surfaces 64 in conjunction with lateral walls 60 and 62 of reel-receiving notch 58 are used for mounting smaller reels. The taper of contact surfaces 56 downwardly from front face 38 to rear face 40 facilitates the secure mounting of a reel within block 12 and provides for the reduction in the chance that reels mounted in a series of blocks 12 will contact each other when the storage system 10 is mounted in a boat, for example. Thus, the taper of contact surfaces 56 is believed to represent a significant advance in the art of fishing reel and rod mounting systems.

While the attached Figures describe a preferred embodiment of the present invention which includes reel-receiving notch 58, it is also contemplated that lateral edges 52 and 54 of rod-receiving notch 50 in conjunction with bottom edges 46 and 48 of lateral faces 42 and 44 define contact surfaces 56. Such an embodiment of mounting block 12 would thus be useful in mounting reels of a single particular size.

Figure 2:
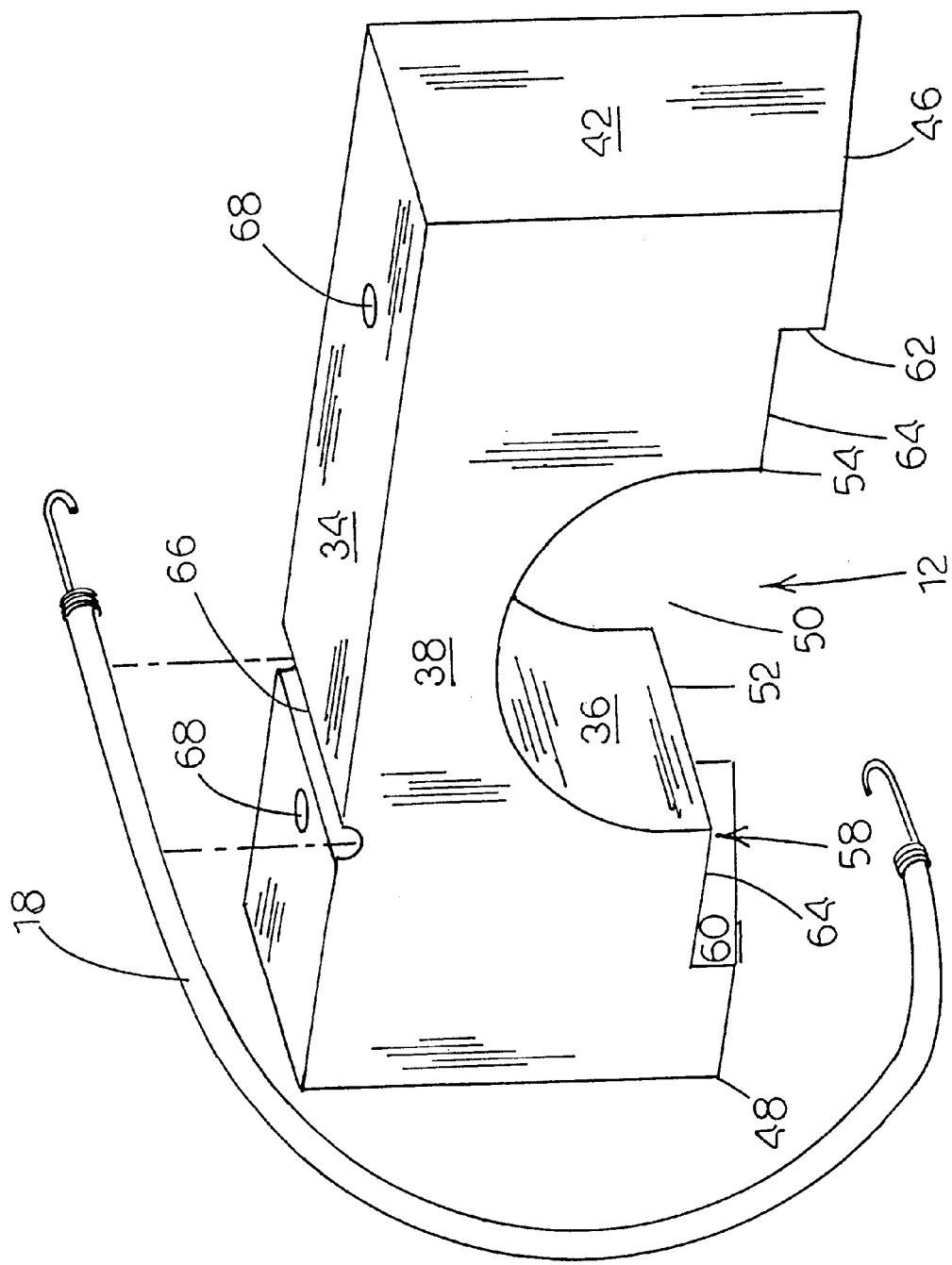
FIG. 2 of the drawings is a perspective view of the mounting block and strap of the present invention.

Continuing with FIGS. 2–5, a notch 66 is formed on top face 34 of mounting block 12. As best seen in FIG. 2, notch 66 receives strap 18, thus facilitating the incorporation of strap 18 into the storage system of the present invention. Alternatively, notch 66 may be formed on another face of block 12, such as front face 38, rear face 40, or lateral faces 42 and 44. Strap 18 may comprise any suitable material as would be apparent to one having ordinary skill in the art, including, but not limited to, leather, nylon, or an elastomeric material. Preferably, strap 18 comprises a shock cord, bungee cord, or other elastic cord.

Continuing with FIGS. 2–5, mounting block 12 further comprises vertical bores 68. Bores 68 are adapted to receive a fastener for attaching mounting block 12 to a surface, such as the surface below a deck 24 on a boat as seen in FIG. 1. Thus, preferably, mounting block 12 is mounted to a desired surface using a screw, nail, or other fastener. However, mounting block 12 may also optionally be mounted by gluing block 12 to a desired surface, or by affixing block 12 to a desired surface by any suitable means, as would be apparent to one having ordinary skill in the art.

Referring again to FIGS. 1 and 6, the method of operation of the system 10 of the present invention is depicted. A rod 20 and a reel 22 are securely mounted within mounting block 12 using strap 18. Strap 18 extends below and around reel 22 through notch 66 and then its ends are connected. Mounting block 12 is attached to deck 24. Rod 20 is maintained within rod-receiving notch 50 and reel 22 is maintained against contact surfaces 56 as formed by bottom face 36, first and second lateral walls 60 and 62 of reel-receiving notch 58, and bottom edges 46 and 48 of lateral faces 42 and 44. Thus, reel 22 represents a larger reel, and it rests against contact surfaces 56. A smaller reel would rest against contact surfaces 64 as defined between first lateral wall 60 and second lateral wall 62 of reel receiving notch 58, and first lateral edge 52 and second lateral edge 54 of rod-receiving notch 50.

It is contemplated that system 10 can comprise a series of mounting blocks 12 which are attached to a surface, such as beneath deck 24, to facilitate the storage of multiple reels and rods. Through the provision of tapered contact surfaces 56 as well as contact surfaces 64, reels can be mounted within the adjacent blocks 12 with a reduced risk of clashing. Indeed, tapered contact surfaces 56 and contact surface 64 substantially prevent the clashing of reels 22, particularly when such reels are stored upon a boat used in deep sea fishing. Further, the ability to store rod 20 and reel 22 such that rod 20 rests above reel 22 in rod receiving notch 50 provides for more efficient storage. Rod 20 does not extend into space within, for example, a cabin of a boat where passengers congregate. Thus, passengers or fishermen on the boat may more easily avoid the stored reels and rods when moving about the boat.

The particular problem solved by use of the improved mounting block of the present invention is the prevention of reels clashing or banging together during rough seas often encountered during deep sea fishing. Thus, it is contemplated that the mounting block is ideal for use on a deep sea fishing boat and in conjunction with the typically more expensive reels used in deep sea fishing.

It will be understood that various details of the invention may be changed without departing from the scope of the invention. Furthermore, the foregoing description is for the purpose of illustration only, and not for the purpose of limitation—the invention being defined by the claims.

What is claimed is:

1. A storage system for a fishing rod and reel, the system comprising:
   (a) a mounting block comprising a top face, a bottom face, a front face, a rear face, and two lateral faces, the rear face and the front face extending downwardly from the top face to the bottom face to define a bottom edge along each of the lateral faces;
   (b) a rod-receiving notch formed in the bottom face of the mounting block between the two lateral faces and extending upwardly into the block toward the top face and laterally into the block toward the lateral faces for a height and width sufficient to accept a rod, the notch having lateral edges;
   (c) contact surfaces for a reel along the bottom face of the mounting block, the contact surfaces defined by the lateral edges of the rod-receiving notch, the bottom face of the mounting block and the bottom edges of the lateral faces of the mounting block, the contact surfaces spaced laterally apart from each other for substantially a reel width; and
   (d) a strap for securing a rod and reel into the mounting block.

2. The system of claim 1, wherein the rear face extends downwardly from the top face for a greater distance than the front face to define a bottom edge along each of the lateral faces which tapers downwardly from the front face to the rear face, and wherein the contact surfaces for the reel taper downwardly from the front face to the rear face.

3. The system of claim 1, wherein the mounting block further comprises a reel-receiving notch formed in the bottom face between the bottom edges of the lateral faces and the lateral edges of the rod-receiving notch, the reel-receiving notch having lateral walls spaced apart for a lesser width than the width of the contact surfaces for a reel and a greater width than the rod-receiving notch to define a second contact surface for a reel between the bottom edges of the lateral faces and the lateral edges of the rod-receiving notch.

4. The system of claim 1, wherein the mounting block further comprises a notch for receiving the strap for securing the rod and reel into the mounting block, the strap-receiving notch formed on at least one face of the mounting block.

5. The system of claim 4, wherein the strap-receiving notch is formed on the top face of the mounting block.

6. The system of claim 1, wherein the strap is selected from the group consisting of a shock cord, bungee cord or other elastic cord.

7. The system of claim 1, wherein the mounting block further comprises at least one bore therethrough, the at least one bore adapted to receive a fastener for attaching the mounting block to a surface.

8. The system of claim 1, further comprising a second mounting member having a tip-receiving structure formed therein for receiving a tip of a rod.

9. The system of claim 7, further comprising a third mounting structure, the third mounting structure having a bore formed therethrough for receiving a handle of a fishing rod.

10. The system of claim 9, wherein the third mounting structure comprises a bulkhead of a boat.

11. A storage system for a fishing rod and reel, the system comprising:
    (a) a mounting block comprising a top face, a bottom face, a front face, a rear face, and two lateral faces, the rear face extending downwardly from the top face to the bottom face for a greater distance than the front face to define a bottom edge along each of the lateral faces which tapers downwardly from the front face to the rear face;
    (b) a rod-receiving notch formed in the bottom face of the mounting block between the two lateral faces and extending upwardly into the block toward the top face and laterally into the block toward the lateral faces for a height and width sufficient to accept a rod, the notch having lateral edges;
    (c) contact surfaces for a reel along the bottom face of the mounting block, the contact surfaces defined by the lateral edges of the rod-receiving notch, the bottom face of the mounting block and the bottom edges of the lateral faces of the mounting block, the contact surfaces spaced laterally apart from each other for substantially a reel width, the contact surfaces tapering downwardly from the front face to the rear face; and
    (d) a strap for securing a rod and reel into the mounting block.

12. The system of claim 11, further comprising a reel-receiving notch formed in the bottom face of the mounting block between the bottom edges of the lateral faces and the lateral edges of the rod-receiving notch, the reel-receiving notch having lateral walls spaced apart for a lesser width than the width of the contact surfaces for a reel and a greater width than the rod-receiving notch to define a second contact surface for a reel between the bottom edges of the lateral faces and the lateral edges of the rod-receiving notch.

13. The system of claim 11, wherein the mounting block further comprises a notch for receiving the strap for securing the rod and reel into the mounting block, the strap-receiving notch formed on at least one face of the mounting block.

14. The system of claim 13, wherein the strap-receiving notch is formed on the top face of the mounting block.

15. The system of claim 11, wherein the strap is selected from the group consisting of a shock cord, bungee cord or other elastic cord.

16. The system of claim 11, wherein the mounting block further comprises at least one bore there through, the at least one bore adapted to receive a fastener for attaching the mounting block to a surface.

17. The system of claim 11, further comprising a second mounting member having a tip-receiving structure formed therein for receiving a tip of a rod.

18. The system of claim 16, further comprising a third mounting structure, the third mounting structure having a bore formed therethrough for receiving a handle of a fishing rod.

19. The system of claim 18, wherein the third mounting structure comprises a bulkhead of a boat.

20. A mounting block for use in a storage system for a fishing rod and reel, the mounting block comprising:
   (a) a top face, a bottom face, a front face, a rear face, and two lateral faces, the rear face extending downwardly from the top face to the bottom face for a greater distance than the front face to define a bottom edge along each of the lateral faces which tapers downwardly from the front face to the rear face; and
   (b) a rod-receiving notch formed in the bottom face of the mounting block between the two lateral faces and extending upwardly into the block toward the top face and laterally into the block toward the lateral faces for a height and width sufficient to accept a rod, the notch having lateral edges; and
   (c) contact surfaces for a reel along the bottom face of the mounting block the contact surfaces defined by the lateral edges of the rod-receiving notch, the bottom face of the mounting block and the bottom edges of the lateral faces of the mounting block, the contact surfaces spaced laterally apart from each other for substantially a reel width, the contact surfaces tapering downwardly from the front face to the rear face.

21. The mounting block of claim 20, further comprising a reel-receiving notch formed in the bottom face between the bottom edges of the lateral faces and the lateral edges of the rod-receiving notch, the reel-receiving notch having lateral walls spaced apart for a lesser width than the width of the contact surfaces for a reel and a greater width than the rod-receiving notch to define a second contact surface for a reel between the bottom edges of the lateral faces and the lateral edges of the rod-receiving notch.

22. The mounting block of claim 20, wherein the mounting block further comprises a notch for receiving a strap for securing the rod and reel into the mounting block, the strap-receiving notch formed on at least one face of the mounting block.

23. The mounting block of claim 1, wherein the strap-receiving notch is formed on the top face.

24. The mounting block of claim 20, further comprising at least one bore therethrough, the at least one bore adapted to receive a fastener for attaching the mounting block to a surface.

25. A method for storing a fishing rod and reel, the method comprising:
   (a) providing a storage system for a fishing rod and reel, the system comprising:
      (i) a mounting block comprising a top face, a bottom face, a front face, a rear face, and two lateral faces, the rear face extending downwardly from the top face to the bottom face for a greater distance than the front face to define a bottom edge along each of the lateral faces which tapers downwardly from the front face to the rear face;
      (ii) a rod-receiving notch formed in the bottom face of the mounting block between the two lateral faces and extending upwardly into the block toward the top face and laterally into the block toward the lateral faces for a height and width sufficient to accept a rod, the notch having lateral edges;
      (iii) contact surfaces for a reel along the bottom face of the mounting block, the contact surfaces defined by the lateral edges of the rod-receiving notch, the bottom face of the mounting block and the bottom edges of the lateral faces of the mounting block, the contact surfaces spaced laterally apart from each other for substantially a reel width, the contact surfaces tapering downwardly from the front face to the rear face; and
      (iv) a strap for securing a rod and reel into the mounting block;
   (b) storing a fishing rod and reel in the system provided in step (a) by placing the rod in the rod-receiving notch and securing the reel against the contact surfaces for the reel with the strap.

26. The method of claim 25, wherein the mounting block of the storage system further comprises a notch for receiving the strap for securing the rod and reel into the mounting block, the strap-receiving notch formed on at least one face of the mounting block.

* * * * *